United States Patent [19]

Cowger et al.

[11] Patent Number: 4,794,409

[45] Date of Patent: Dec. 27, 1988

[54] INK JET PEN HAVING IMPROVED INK STORAGE AND DISTRIBUTION CAPABILITIES

[75] Inventors: Bruce Cowger; Robert Beeson, both of Corvallis, Oreg.

[73] Assignee: Hewlett-Packard Company, Palo Alto, Calif.

[21] Appl. No.: 129,030

[22] Filed: Dec. 3, 1987

[51] Int. Cl.[4] .............................................. G01D 15/16

[52] U.S. Cl. ................................ 346/140 R; 222/187; 222/189

[58] Field of Search ................ 346/140; 222/187, 189, 222/422, 481; 239/326

[56] References Cited

U.S. PATENT DOCUMENTS 4,630,758 12/1986 Mutoh .............................. 346/140 X 4,689,641 8/1987 Scardovi .............................. 346/140

*Primary Examiner*—Joseph W. Hartary

*Attorney, Agent, or Firm*—William J. Bethurum

[57] ABSTRACT

An ink jet pen (or other similar fluid delivery system) wherein primary and secondary ink reservoirs and an ink jet printhead are all interconnected by way of a porous ink-transfer member. The ink will pass directly from the primary ink reservoir to the printhead under a normal or predetermined range of temperatures and pressures. However, for temperatures and pressures outside this range, the secondary reservoir will be brought into operation to give or receive ink to or from the porous ink transfer member and thereby serve to maintain a substantially constant backpressure at the printhead.

9 Claims, 2 Drawing Sheets

INK JET PEN HAVING IMPROVED INK STORAGE AND DISTRIBUTION CAPABILITIES

TECHNICAL FIELD

This invention relates generally to ink jet pens for use in ink jet printing systems and more particularly to such pens having an increased ink reservoir capacity and improved ink distribution characteristics.

BACKGROUND ART

In the manufacture of disposable pens for various types of ink jet printers, various approaches have been taken to insure that a substantially constant backpressure (or sub-atmospheric pressure) is provided to the printhead of the pen as the ink is depleted from full to empty during an ink jet printing operation. In this manner, the size of the ink drops ejected from an orifice plate of the pen will remain constant during ink depletion, and additionally this backpressure will prevent leakage of ink from the orifice plate when an orifice is not firing. One such approach to providing a substantially constant backpressure in the ink reservoir of a thermal ink jet pen is disclosed and claimed in U.S. Pat. No. 4,509,062 issued to Robert Low et al and entitled "Ink Reservoir with Essentially Constant Negative Backpressure".

Whereas the approach described in the above Low et al patent has proven highly satisfactory and unique in most respects, this approach nevertheless requires and relies upon a collapsible bladder in order to maintain a substantially constant backpressure in the ink reservoir over a certain range of ink depletion therein. This requirement for a collapsible bladder has certain attendant disadvantages, in particular, volumetric inefficiency. These disadvantages have been overcome by the present invention and will be appreciated and better understood from the description to follow.

Another more recent approach to storing ink in an ink reservoir of a disposable ink jet pen and without using a collapsible bladder is disclosed and claimed in copending application Ser. No. 880,774 of Jeffrey Baker et al, filed July 1, 1986, assigned to the present assignee and incorporated herein by reference. In this latter approach, a reticulated polyurethane foam is used as an ink storage medium for both black and color pens. This more recent technique of storing the ink in a porous medium such as polyurethane foam poovides several new and useful improvements with respect to earlier bladder type storage techniques. However, the requirement for a porous storage medium in the main ink reservoir of the pen limits the volumetric storage efficiency of the ink reservoir. Also, the backpressure cannot be made as nearly constant ring ink depletion as in the method disclosed herein. And, the cut and cleaned foam adds a significant cost to the foam storage type pen.

DISCLOSURE OF INVENTION

It is a general object of the present invention to provide still further new and useful improvements in ink jet pens including the capability of ink storage without using a porous material or other ink storage media and requiring their associated storage space within the pen body housing.

Another object is to provide a new and improved ink jet pen of the type described in which the volume of ink storage has been substantially increased relative to foam storage in other similar types of ink jet pens in the prior art.

Another object is to provide an ink jet pen of the type described whose ink storage volume can be greatly increased by redesign, should this prove desirable. Storage of ink in foam looses an undesirable upper limit on the volume of ink that can be stored.

Another object is to provide an ink jet pen of the type described which operates with a substantially constant nominal backpressure over a predetermined wide range of temperatures and other environmental conditions during the operation of the pen as it is depleted from full to empty.

Another object is to provide an ink jet pen of the type described whose backpressure is less affected by ink flow rate than those pens which store ink in foam.

Another object is to provide a new and improved ink jet pen of the type described which is reliable in operation and durable and economical in construction and which uses no mechanically moving parts.

Another object is to provide a new and improved ink jet pen of the type described which can directly and visually indicate the amount of ink still stored within it.

The above objects and other advantages and novel features of this invention have been accomplished by the provision of an ink jet pnn comprising a pen body housing having a primary ink reservoir section, a secondary ink reservoir section and a printhead support section therein. An ink passageway interconnects all of the above sections for passing ink from the primary ink reservoir section to both the secondary ink reservoir section and the printhead support section during an ink jet printing operation. A porous member is mounted between the ink passageway and both the secondary ink reservoir section and the printhead support section, and a printhead member is mounted on the outer surface of the printhead support section for receiving ink from the porous member during ink jet printing. Ink passes back and forth between the primary and secondary ink reservoirs and through the porous member during changes in operating conditions (temperatures and ambient pressures) to thereby prevent ink from leaking out of the printhead orifii.

The above brief summary of the present invention will become better understood in the following detailed description of the accompanying drawings wherein:

DETAILED DESCRIPTION AND MODE OF OPERATION

Figure 1:
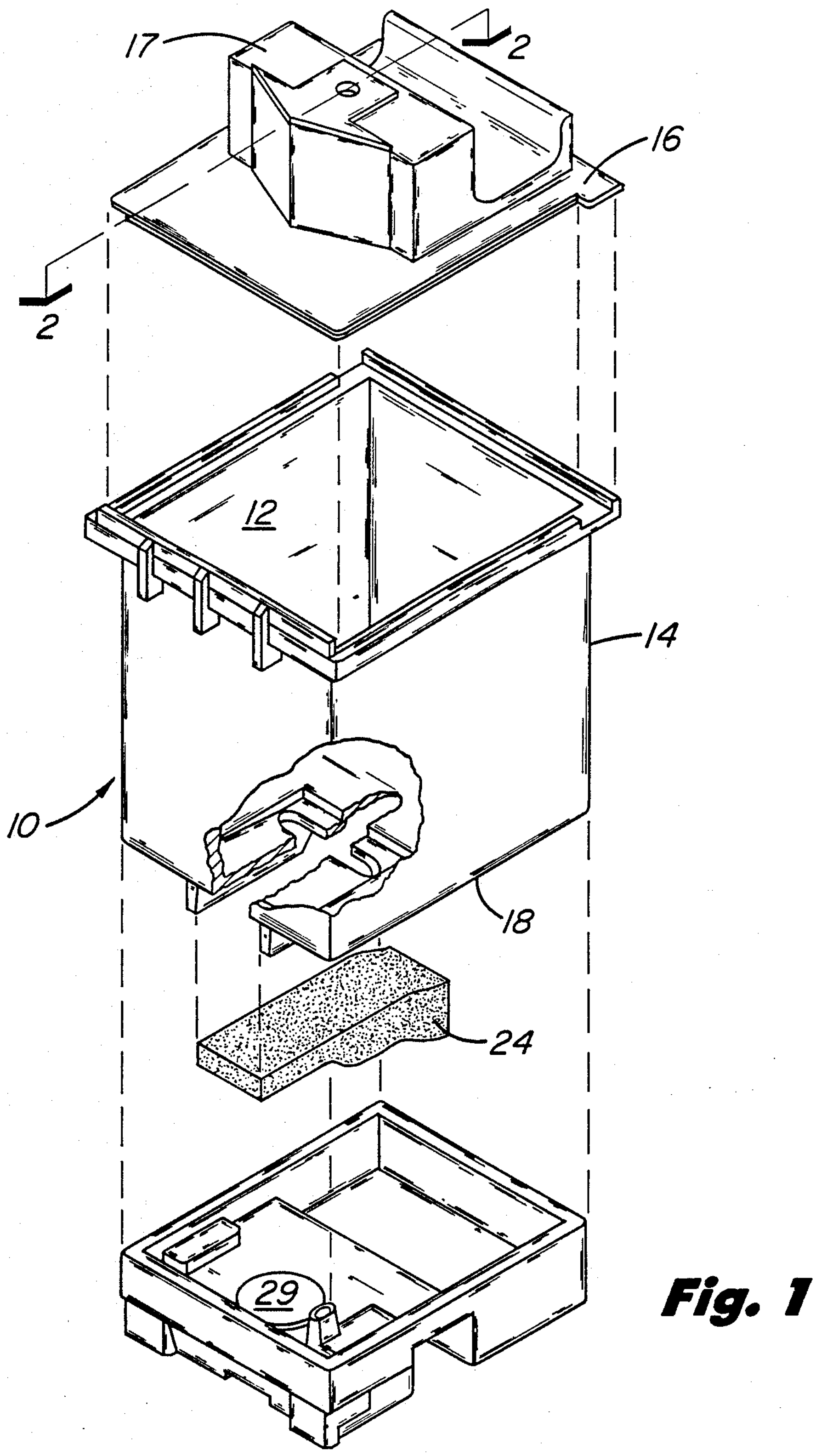
FIG. 1 is an exploded isometric view of the ink jet pen according to the present invention.
Figure 2:
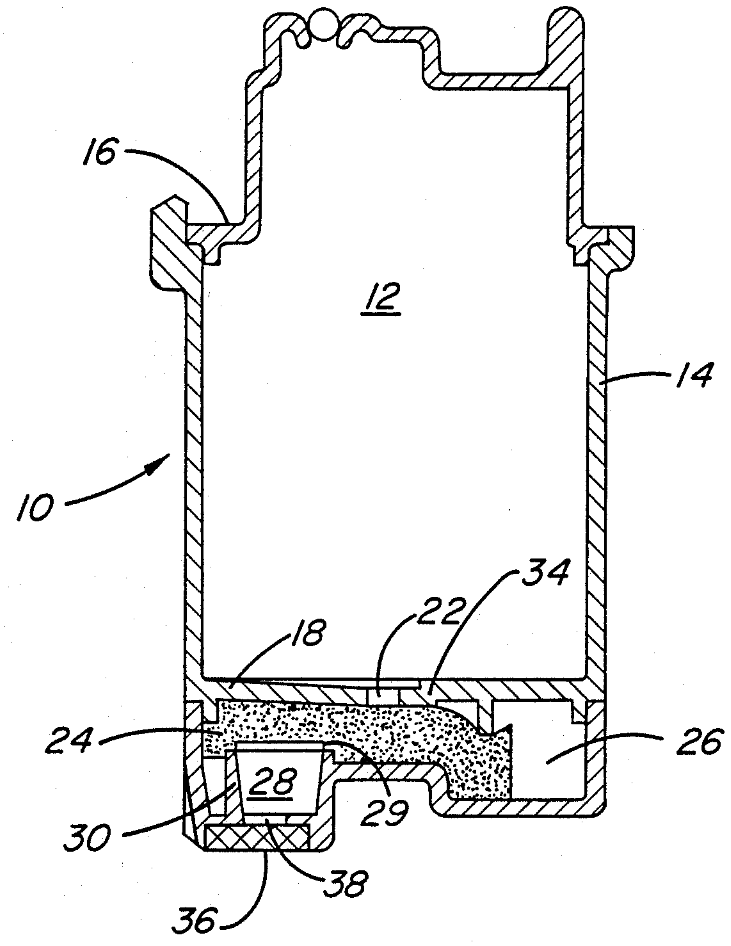
FIG. 2 is a cross sectional view taken along lines 2—2 of FIG. 1.

Referring now to both FIGS. 1 and 2, the pen body housing is designated generally as 10 and includes a main or upper ink reservoir 12 which is bounded by side walls 14, a top cover plate 16 and a bottom wlll 18. The top wall or cover plate 16 is integrally joined to a top plug member 17, the whole of which is hermetically sealed to the pen body 10.

The bottom wall 18 of the pen 10 includes an ink flow passageway 22 therein whioh is also sometimes referred to herein as the "gate". The ink will pass through the passageway or gate 22 and then through a chosen porous material 24 before entering into either a secondary reservoir 26 or into a printhead support section 28 by way of a filter 29 in a manner to be further described. The secondary or lower reservoir 26 is also sometimes referred to herein as the "catchbasin", and the printhead support section 28 includes upstanding vertical side walls 30 which extend as shown into direct contact with the porous material 24.

The porous material 24 is preferably a reticulated cellulose foam, and it is positioned as shown in FIG. 2 so that its right side portion abuts a protruding sill 34. The sill 34 extends as shown from the bottom surface of the wall member 18 and into the secondary reservoir or catchbasin 26. This sill 34 somewhat compresses the adjacent portion of the foam material 24, thereby increasing its local capillarity. But even greater compression, and hence greater capillarity, are imparted to the left hand side of the foam 24 by the filter 29 which also extends into the foam material 24 and is supported by the vertical walls 30. Without this differential compression from side to side of the foam 24, air would be drawn through the foam material 24 and toward the filter 29, and the ink flow path from the gate 22 to the filter 29 would be interrupted.

A thin film resistor (TFR) ink jet printhead 36 is mounted as shown on the external downwardly facing surface of the pen body housing and is operative to receive ink from the foam material 24 and through the filter 29. The ink then passes through a central ink feed passage 38 and to the thin film printhead 36. This printhead may be one of the many different types generally known in the art, such as the one described in some detail in the *Hewlett-Packard Journal, Vol.* 36, *No.* 5, *May* 1985, incorporated herein by reference. Typically, the thin film resistor printhead 36 will have conductive trace material (not shown) thereon which leads to a plurality of resistive heater elements and which also extends to outer electrical contact pads on the TFR substrate. These contact pads in turn are electrically connected to either a flexible (FLEX) circuit or to a tape automated bond (TAB) circuit (not shown) of the type which can be conveniently mounted on one of the outer side wall surfaces of the vertical housing wall 14. Such a TAB circuit connection may, for example, be of the type disclosed and claimed in U.S. Pat. No. 4,635,073, issued to Gary E. Hanson, assigned to the present assignee and incorporated herein by reference. The FLEX or TAB circuit in turn will connect the TFR printhead to additional external driving circuitry once the pen 10 is inserted in a printer carriage assembly (not shown).

OPERATION

When the printhead 36 fires, it generates a suction on the ink supply system within the pen body 10. Ink is pulled by this suction from main supply reservoir 12, out of the gate passageway 22 and through the foam 24 and filter 29, and then down into the stand pipe defined by the vertical walls 30 and to the printhead. This action lowers the pressure within the main ink reservoir 12 which is hermetically sealed except for the gate 22, and a pressure differential is thus created across the sill 34 and the adjacent foam 24. When first commencing a printing operation, air moves from right to left across the sill 34 under the action of the above pressure differential, thereby displacing ink from capillary spaces which exist between the foam material 24 and the sill 34. Upon reaching the gate 22, this air collects into bubbles which float up into the main reservoir 12 and thus partially relieve the below-atmospheric pressure in the reservoir 12.

The growth of each air bubble is very abrupt, but it is not instantaneous. When the air bubble is small it has little buoyancy, and surface tension forces hold the bubble onto either the foam material 24 or the solid material which forms the gate 22. However, continued bubble growth reverses the relative magnitudes of these forces on the air bubble, and the bubble eventually breaks loose from the foam 24 and gate material and floats up into the main ink reservoir 12.

In order to set the backpressure at the printhead 36 within a desired range, one must clearly understand this bubble formation. In particular, the choices of foam material, foam cleaning processes, local foam compression, gate geometry, gate material, surface finishes, and ink surface tension will each partially determine the pen's nominal backpressure. In the preferred embodiment of this invention, some of these values are set forth in the table below and represent the presently known best mode for practicing the invention:

TABLE

| | |
|---|---|
| *Foam material | Kanebo sponge block, grade T |
| *Foam cleaning | Compress and release 20 times in fresh DI water. Repeat twice (60 total compressions) |
| *Foam compression in felted axis (Felting axis perpendicular to planes of filter and gate) | 50% at filter<br>32% at gate<br>0% at catchbasin (right hand side of foam) |
| *Gate geometry | Obround slot, 0.125 inch diameter × 0.388 inch long |
| *Gate material | ABS |
| *Gate surface finish | Machined (approximately 128 micro-inches, RMS) |
| *Ink surface tension | 62 dyne/cm |

The backpressure at the printhead 36 is substantially the same as the pressure just above the gate 22, except for the elevation change and minor head losses due to ink flow through the foam 24 and the filter 29. In addition, the pressure differential across the sill 34 from the ambient air in the secondary reservoir 26 to the gate 22 remains constant throughout the life of the pen 10. When the printhead 36 stops printing, the air/ink interface adjacent the bottom wall 18 retreats very slightly away from the gate 22 and into the foam. Absent temperature changes, this interface will remain in this quiescent position until printing resumes.

When the temperature in the main ink reservoir 12 rises (or the ambient pressure falls), ink is forced downwardly out of the gate 22 by the expanding air which accompanies this temperature rise (pressure change). When this happens, the present design and construction of the pen 10 makes it easier for the ink to be pushed out of the low capillarity right hand side of the foam material 24 than out of the higher capillarity printhead orifii. At this point, the capillary space between the foam 24 and the sill 34 is refilled with ink.

If the printhead 36 continues to fire during this time, it will take ink at a very low backpressure from the secondary reservoir 26 until the ink in the secondary reservoir 26 is exhausted. At this point normal operation of ink flow from the main ink reservoir 12 and to the printhead 36 resumes.

If instead the operating temperature of the pen is lowered while there is ink in the catchbasin (or the ambient pressurerrises), it is easier for this ink to return to the main ink reservoir than for air to be pulled across the sill 34 and create air bubbles as previously described. This action is because there is no energy required to bring the ink in the catchbasin into the saturated foam, whereas energy is required to create additional air to ink interface as air crosses the sill and forms bubbles in the ink. Therefore, the pen 10 returns itself to its normal condition when the elevated temperature (or pressure) condition passes.

Various modifications may be made to the above described embodiment without departing from the scope of this invention. For example, the present invention is not limited to use in ink jet pens and may instead be used in other fluid delivery systems which have a need to accommodate fluctuations in ambient temperature and pressure in the manner described above. Therefore, for such other diverse fluid delivery systems it may be necessary to redesign certain portions of the pen and TFR printhead therefor in order to change drop volumes, drop ejection frequency, and fluid storage capacity, and accommodate for changes in fluid viscosity and the like.

We claim:

1. An ink jet pen comprising:

a. a pen body housing having a primary ink reservoir section, a secondary ink reservoir section and printhead support section, with said sections being adjacent to one another, and a passageway interconnecting all of said sections for passing ink from said primary ink reservoir section to both said secondary ink reservoir section and said printhead support section, b. a porous member mounted between said passageway and both said printhead support section and said secondary ink reservoir section for passing ink thereto during an ink jet printing operation and for passing ink back and forth between said primary and secondary reservoirs and through said porous member during changes in temperature and pressure within said pen, and c. a printhead member mounted on said printhead support section for receiving ink from said porous member during ink jet printing.

2. The ink jet pen defined in claim 1 wherein said porous member is a reticulated fomm.

3. The ink jet pen defined in claim 1 wherein said printhead member is a thin film resistor type thermal ink jet printhead.

4. A fluid delivery system from which fluid is drawn from a primary reservoir and through an output orifice plate characterized in that a secondary reservoir is positioned adjacent said primary reservoir and that a porous fluid transfer member is positioned between said primary and secondary reservoirs, between said primary reservoir and said orifice plate, and between said secondary reservoir and said orifice plate, and means for creating a capillary pressure differential from one side of said fluid transfer member to the other, whereby fluid can be drawn into or out of said secondary reservoir and from or to said fluid transfer member, respectively, with changes in temperature and pressure of the fluid.

5. The fluid delivery system defined in claim 4 wherein said orifice plate is part of an ink jet printhead.

6. The fluid delivery system defined in claim 4 wherein said primary and secondary reservoirs are bounded by a common wall having an opening therein for passing fluid to said fluid transfer member.

7. The fluid delivery system defined in claim 6 wherein a sill extends from said common wall into said fluid transfer member to increase the local capillarity thereof and aid in creating a pressure differential within said fluid transfer member.

8. The system defined in claim 7 wherein said orifice plate is part of an ink jet printhead.

9. The system defined in claim 8 wherein said fluid transfer member is a porous foam material.

* * * * *

UNITED STATES PATENT AND TRADEMARK OFFICE

CERTIFICATE OF CORRECTION

PATENT NO. : 4,794,409

DATED : December 27, 1988

INVENTOR(S) : Bruce Cowger
Robert Beeson

It is certified that error appears in the above-identified patent and that said Letters Patent is hereby corrected as shown below:

Column 1, line 49, delete "poovides", insert --provides--.

Column 1, line 55, delete "ring", insert --during--.

Column 2, line 6, delete "looses", insert --imposes--.

Column 2, line 26, delete "pnn", insert --pen--.

Column 5, line 1, delete "pressurerrises", insert --pressure rises--.

Column 6, line 7, delete "fomm", insert --foam--.

Signed and Sealed this

Seventeenth Day of October, 1989

*Attest:*

DONALD J. QUIGG

*Attesting Officer* *Commissioner of Patents and Trademarks*